Figure 1:
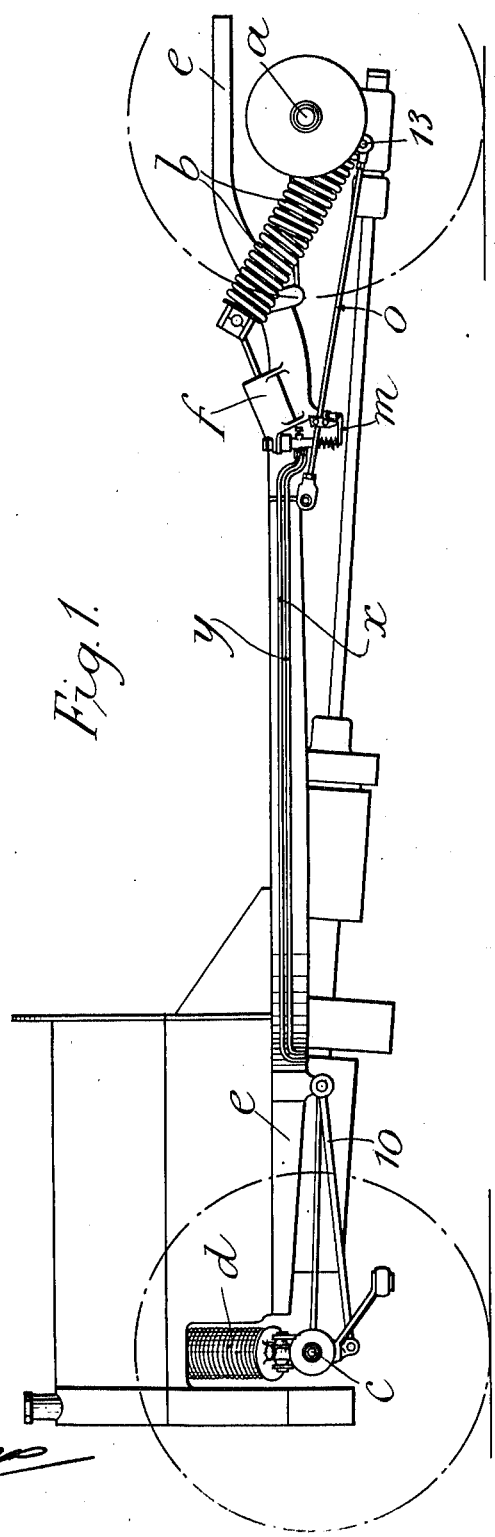

G. H. NORMAN.
SPRING SUSPENSION ARRANGEMENT OF MOTOR CARS AND OTHER VEHICLES.
APPLICATION FILED JAN. 18, 1913.

1,096,938.

Patented May 19, 1914.
5 SHEETS—SHEET 1.

G. H. NORMAN.
SPRING SUSPENSION ARRANGEMENT OF MOTOR CARS AND OTHER VEHICLES.
APPLICATION FILED JAN. 18, 1913.

1,096,938.

Patented May 19, 1914.
5 SHEETS—SHEET 3.

G. H. NORMAN.
SPRING SUSPENSION ARRANGEMENT OF MOTOR CARS AND OTHER VEHICLES.
APPLICATION FILED JAN. 18, 1913.

1,096,938.

Patented May 19, 1914.

5 SHEETS—SHEET 4.

G. H. NORMAN.
SPRING SUSPENSION ARRANGEMENT OF MOTOR CARS AND OTHER VEHICLES.
APPLICATION FILED JAN. 18, 1913.

1,096,938.

Patented May 19, 1914.

5 SHEETS—SHEET 5.

UNITED STATES PATENT OFFICE.

GEOFFREY HAMILTON NORMAN, OF BLACKHEATH, ENGLAND.

SPRING-SUSPENSION ARRANGEMENT OF MOTOR-CARS AND OTHER VEHICLES.

1,096,938. Specification of Letters Patent. Patented May 19, 1914.

Application filed January 18, 1913. Serial No. 742,905.

*To all whom it may concern:*

Be it known that I, GEOFFREY HAMILTON NORMAN, a subject of the King of Great Britain and Ireland, residing at Blackheath, in the county of Kent, England, have invented Improvements in Spring-Suspension Arrangements of Motor-Cars and other Vehicles, of which the following is a specification.

This invention has reference to spring suspension arrangements of motor cars and other vehicles comprising one or more springs that act upon an axle and can be adjusted in relation thereto to suit the load; and according to the present invention such adjustment is effected by oil or other liquid being forced into or allowed to escape from one or more cylinder and piston arrangements or equivalent that is or are connected to the spring or springs, the entry and release of the liquid being dependent upon displacement of the vehicle in relation to the axle and occurring only when adjustment is required, the liquid serving at other times as an unyielding abutment for the spring or springs. Preferably the spring or springs acts or act on the axle in a direction inclined to the direction of movement of the axle during displacement, adjustment of the spring or springs to suit the load being effected by manually or automatically varying the inclination of the spring or springs and consequently also varying the vertical component of the spring pressure.

The cylinder or each cylinder is in communication through a non-return valve with a liquid circuit including a pump driven in any convenient manner from the engine and a valve which is normally held open against the action of a spring by say a bell crank carried by the vehicle frame and kept up to its work by a cam on a part such as a radius rod moving with the axle in relation to the frame; normally the liquid is pumped freely through the circuit but as the vehicle is loaded and its frame depressed in relation to the axle, the circuit valve is allowed to be closed by its spring owing to the cam moving away from the bell crank or equivalent device and, when the said valve is closed the pressure of the oil on the one side of it increases and the non-return valve is thus opened and oil forced past it into the cylinder until the inclination of the spring is adjusted by shifting its point of abutment against the frame so that the vertical component of the spring pressure is sufficient to restore the proper relation of the vehicle frame and the axle whereupon the bell crank or the like will again open the circuit valve and allow the oil being pumped to circulate freely. On the load being reduced the cam will actuate the bell crank so as to still further open the circuit valve, which will then open the non-return valve and allow the escape from the cylinder into the circuit of sufficient oil to readjust the spring to the reduced load.

Figure 2:
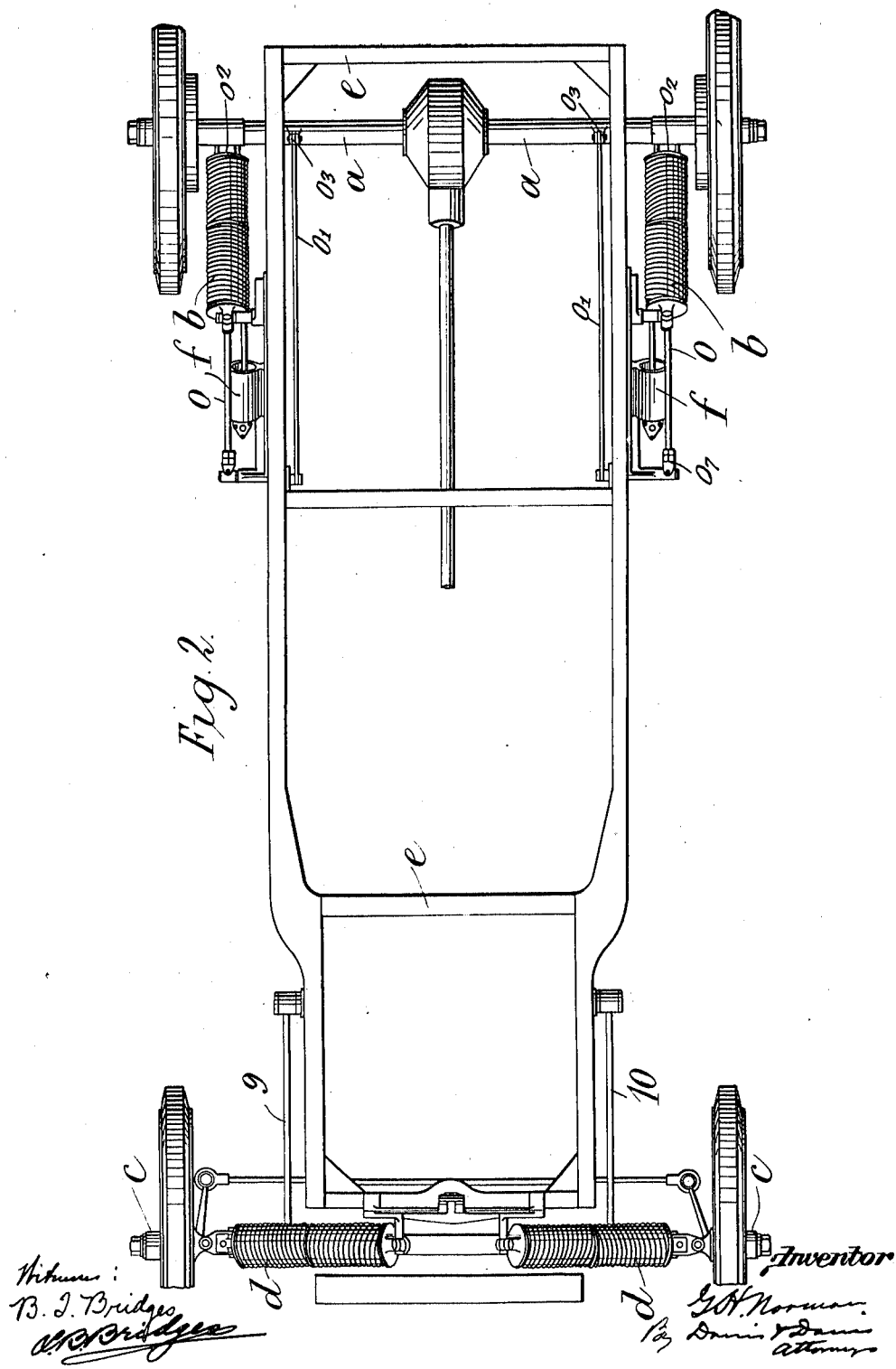
Figure 3:
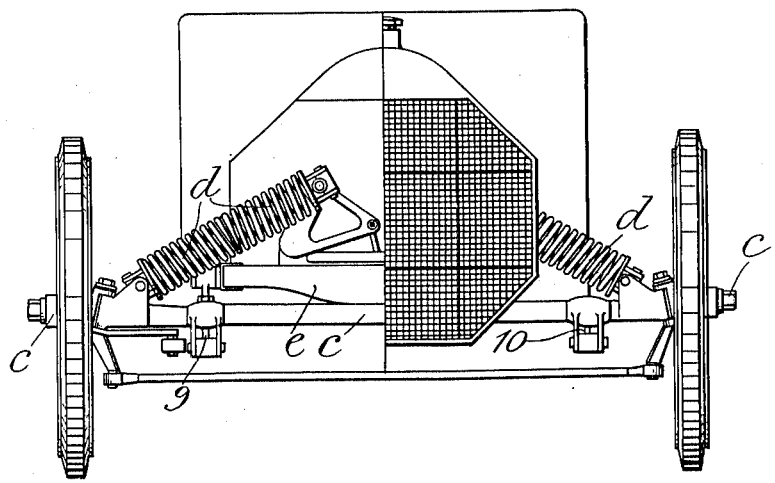
Figure 4:
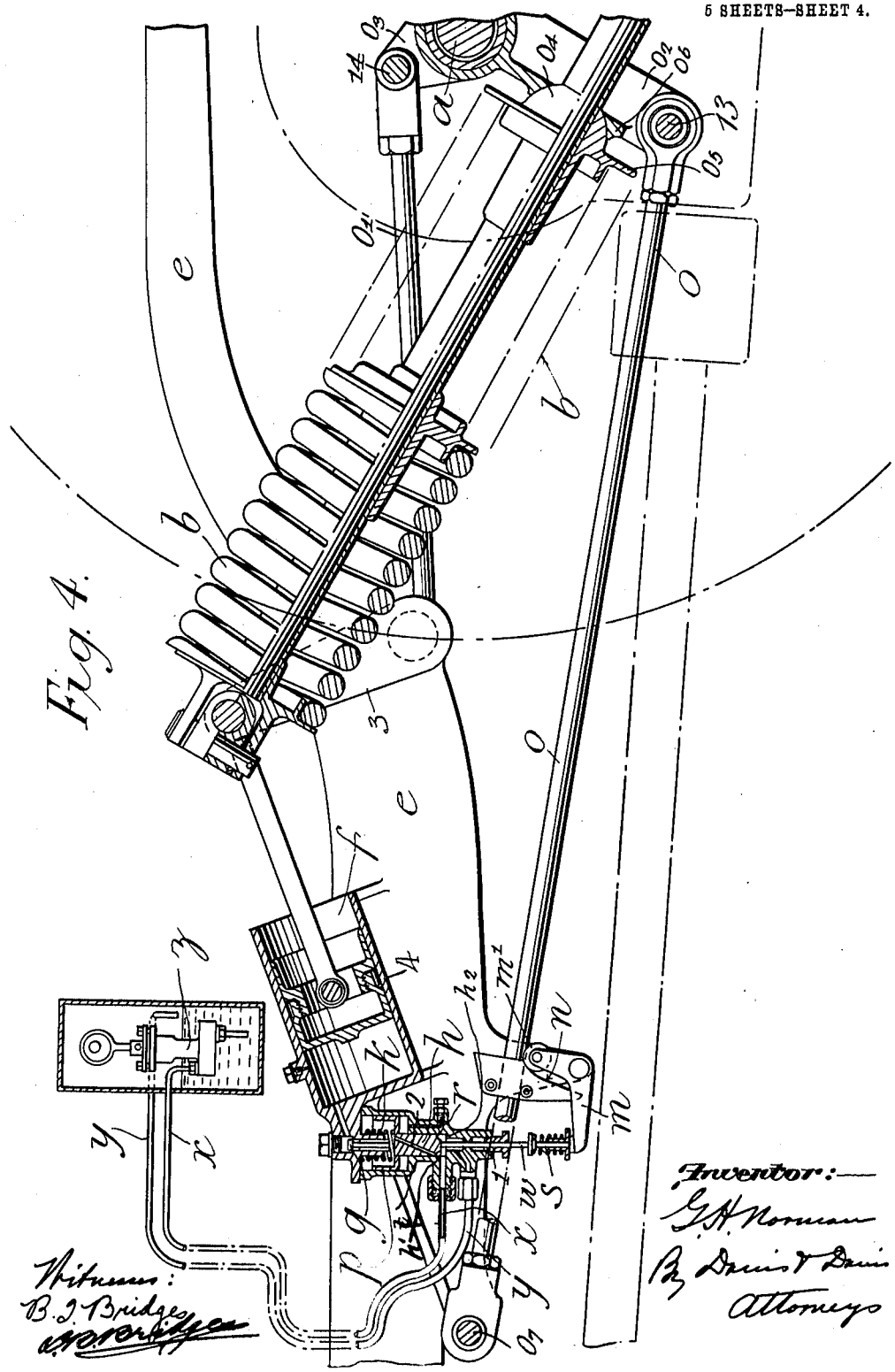

Figure 1 of the accompanying illustrative drawings shows in side elevation a spring suspension arrangement according to this invention suitable for a motor car. Fig. 2 is a plan of the same, and Fig. 3 an end view partly in section. Fig. 4 is a sectional elevation showing parts of the arrangement to a larger scale than that of Figs. 1, 2 and 3, and Figs. 5 and 6 are respectively a longitudinal and a transverse view of the front spring arrangement.

*a* indicates the rear axle of the vehicle, *b* the springs in connection therewith, *c* the front axle, *d* the front axle springs and *e* the vehicle frame.

*f* indicates the oil cylinder for adjusting the rear axle springs *b*, *g* the non-return valve, *h* the circuit valve which is normally held open against the action of a spring *k* by means of a bell crank lever *m* and *n* indicates the cam on the radius rod *o* which keeps the lever *m* up to its work.

Oil is circulated through the supply pipe *x* and return pipe *y* of the circuit by means of the engine-driven pump *z*.

The circuit valve *h* is formed as or with a dashpot *p* the action of which can be adjusted by a needle valve *r*, and the circuit valve is not directly actuated by the bell crank *m* or equivalent but through a strong spring *s* so that movements of the vehicle frame *e* in relation to the axle due to inequalities of the road do not complete the movement of the circuit valve *h* which is only effectively moved when the load of the vehicle is changed.

The non-return valve *g* and the circuit valve *h* are preferably arranged as shown in a single casing *t* in line, the valve *h* being formed at one end with a spindle *w* projecting through a gland 1 at the corresponding end of the casing, the valve proper being formed by a shoulder $h'$ on the spindle working toward and from a seat $h^2$ between supply and return branches $x$ and $y$ of the circuit and the communication to the non-return valve $g$ being through a passage 2 through the valve stem and its dash pot piston.

On each side of the vehicle the rear axle $a$ is connected with the frame $e$ by the radius rods $o$, $o_1$, pivotally connected at 13, 14 respectively to arms $o_2$, $o_3$, carried by the axle $a$. The thrust of the spring $b$ is transmitted at its lower end to a hemispherical bearing $o_4$ formed on the abutment $o_5$ of the spring, and seated in a correspondingly curved recess $o_6$ formed in the arm $o_2$ the spring being thus readily movable to adjust its inclination to the vertical. When, upon an increase of load, the axle $a$ approaches the frame $e$, the rod $o$ also approaches the frame turning upward relatively to the frame about its pivot $o_7$. By this means the cam $n$ is caused to move away from the bell crank $m$, thus permitting the circuit valve $h$ to be closed by its spring $k$, preventing liquid under pressure supplied by the pipe $x$ from returning by the pipe $y$, and diverting such liquid through the passage 2 and valve $g$ to the cylinder $f$ thereby actuating the piston 4 to move the spring $b$ into a position more nearly approaching the vertical. As this adjustment of the spring $b$ is effected, the increased vertical component of the spring pressure causes a corresponding increase in the distance between the axle and the frame, thus again bringing the radius rod $o$ into a position such that its cam $n$ acts on the roller $m_1$ of the bell crank $m$ and thus opens the circuit valve $h$.

Upon a reduction of the load, the distance between the axle $a$ and the frame increases, with the result that the radius rod $o$ is caused to move away from the frame, turning on its pivot $o_7$, and the cam $n$ is caused to bear against the roller $m_1$ on the bell crank $m$, and thereby to raise the spindle $w$ sufficiently to cause the valve $h$ to come in contact with the spindle of the non-return valve $g$ and to unseat this valve, thereby providing a passage for the return of liquid from the cylinder $f$ to the circuit through the valve $g$ the passage 2, and the circuit valve $h$ until by the inward movement of the piston 4 in the cylinder $f$ the spring $b$ is caused to assume a more horizontal position, thus reducing the vertical component of its pressure and permitting the frame $e$ and radius rod $o$ to approach each other until the valve $g$ closes, thus causing the liquid remaining in the cylinder to provide an unyielding abutment for the spring $b$.

As will be understood, arrangements embodying the present invention may be variously modified, but it is convenient to incline the two rear springs $b$ forwardly and upwardly from the axle $a$ as shown, the upper ends being anchored to cranks 3 that are mounted in the vehicle frame $e$ and coupled to the pistons 4 of hydraulic cylinders $f$ each connected after the manner described to the circuit of a separate pump, and it is also convenient to incline the front springs $d$ in opposite directions transversely, and to similarly anchor them to cranks 6.

Figure 5:
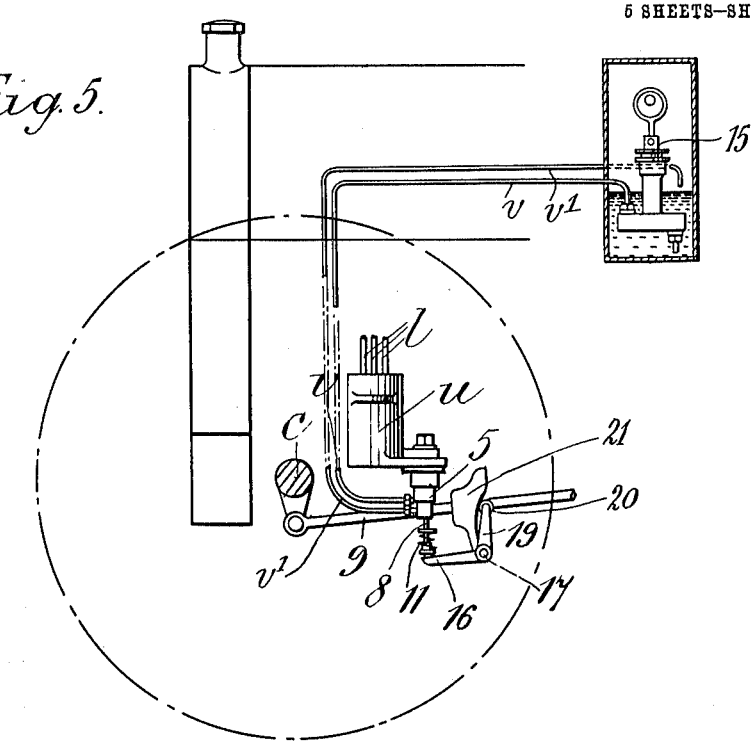
Figure 6:
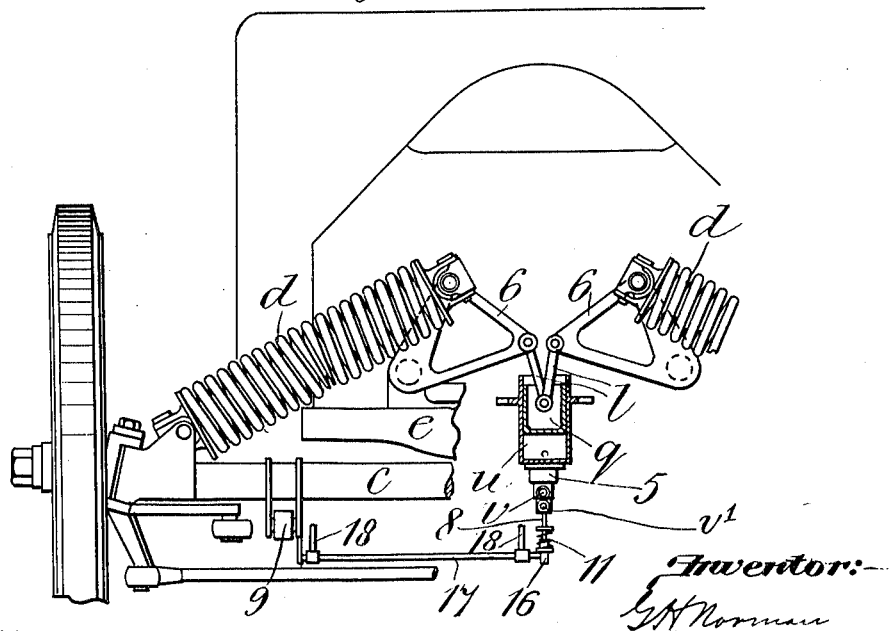

In the arrangement illustrated in Figs. 5 and 6, the front axle $c$ is carried by a pair of radius rods 9, 10 pivotally connected with the said axle and the frame $e$, the rod 10 being that shown in Figs. 1 to 4. The front springs $d$ are conveniently arranged transversely of the vehicle and upwardly inclined toward each other, and connected to the cranks 6, which are jointly connected through rods $l$ to the piston $q$ of a hydraulic cylinder $u$ connected with the supply pipe $v$ and return pipe $v_1$ of a separate liquid circuit preferably supplied by a separate engine-driven pump 15. The cylinder $u$ is provided with a valve casing 5 resembling the casing $t$ of the rear axle arrangement, within which is arranged a non-return valve, a circuit valve, and a dashpot similar to those already described with reference to the casing $t$. The spindle 8, which projects similarly to the spindle $w$, is actuated, through a spring 11 resembling the spring $s$, by a tappet 16 carried by a shaft 17 journaled in brackets 18 on the frame $e$. The shaft 17 also carries a tappet 19 furnished with a roller 20 that runs on a cam 21 carried by the radius rod 9 the operation of these parts 9—21, 16 and 19, 11—8 being similar to that of the corresponding parts $o$, $n$, $m$ $s$, $w$, pertaining to the rear axle arrangement.

What I claim is:—

1. In a vehicle spring suspension device the combination of a spring adjustably arranged between the axle and frame of the vehicle, and means for effecting the adjustment of said spring to suit the load, comprising members relatively displaceable under liquid pressure, one of said members being connected with said spring, a circuit adapted to be supplied with liquid under pressure, and means adapted to be actuated by the relative movement of the axle and vehicle frame consequent on change of load and to control the passage of liquid under pressure between said circuit and said displaceable members to adjust the spring.

2. In a vehicle spring suspension device the combination of a spring adjustably arranged between the axle and frame of the vehicle, and means for effecting the adjustment of said spring to suit the load, comprising members relatively displaceable under liquid pressure, one of said members being connected with said spring, a circuit adapted to be supplied with liquid under pressure, a circuit valve adapted by its movement to complete said circuit or to interrupt the same, a spring acting on said circuit valve and tending to maintain it in a position such that said circuit is interrupted, and liquid admitted to actuate said displaceable members whenever the vehicle frame is depressed relatively to its axle, and means adapted to be actuated by the movement of the vehicle frame relatively to its axle for actuating said circuit valve against the action of its spring to complete said circuit.

3. In a vehicle spring suspension device, the combination of a spring adjustably arranged between the axle and frame of the vehicle, and means for effecting the adjustment of said spring to suit the load, comprising a cylinder carried on the vehicle frame, a piston movable within said cylinder, a piston rod connecting said piston with said spring, a circuit adapted to be supplied with liquid under pressure, and means adapted to be actuated by the relative movement of the axle and vehicle frame consequent on change of load, and to control the passage of liquid under pressure between said circuit and said cylinder according as the vehicle frame is depressed or raised relatively to the axle.

4. In a vehicle spring suspension device, the combination of a spring adjustably arranged between the axle and frame of the vehicle, and means for effecting the adjustment of said spring to suit the load, comprising a cylinder carried on the vehicle frame, a piston movable within said cylinder, a piston rod connecting said piston with said spring, a circuit adapted to be supplied with liquid under pressure, a circuit valve adapted by its movement to complete said circuit, or to interrupt the same and admit liquid therefrom to the cylinder, a spring acting on said circuit valve and tending to maintain it in a position such that said circuit is interrupted, and means adapted to be actuated by the movement of the vehicle frame relatively to its axle for actuating said circuit valve against the action of its spring to complete said circuit.

5. In a vehicle spring suspension device the combination of a spring adjustably arranged between the axle and frame of the vehicle, and adapted to act thereon in a direction inclined to the direction of movement of the axle during displacement, means for varying the inclination of the spring in such manner that upon an increase or decrease of the load, the vertical component of the spring pressure is increased or decreased, comprising members relatively displaceable under liquid pressure, one of said members being connected with said spring, a circuit adapted to be supplied with liquid under pressure and means adapted to be actuated by the relative movement of the axle and vehicle frame consequent on change of load and to control the passage of liquid under pressure between said circuit and said displaceable members to adjust the spring.

6. In a vehicle spring suspension device the combination of a spring adjustably arranged between the axle and frame of the vehicle and adapted to act thereon in a direction inclined to the direction of movement of the axle during displacement, means for varying the inclination of the spring, comprising members relatively displaceable under liquid pressure, one of said members being connected with said spring, a circuit adapted to be supplied with liquid under pressure, a circuit valve adapted by its movement to complete said circuit or to interrupt the same, a spring acting on said circuit valve and tending to maintain it in a position such that said circuit is interrupted and liquid admitted to actuate said displaceable members whenever the vehicle frame is depressed relatively to its axle, and means adapted to be actuated by the movement of the vehicle frame relatively to its axle for actuating said circuit valve against the action of its spring to complete said circuit.

7. In a vehicle spring suspension device the combination of a spring adjustably arranged between the axle and frame of the vehicle, means for effecting the adjustment of said spring to suit the load comprising members relatively displaceable under liquid pressure and respectively connected with said spring and with the vehicle frame, a liquid circuit adapted to be supplied with liquid under pressure, a non-return valve adapted when the circuit is interrupted by the circuit valve, to be opened by liquid pressure to admit liquid to relatively displace said members and adapted, moreover when the circuit valve is moved to complete the circuit, to be opened by the circuit valve to permit of the return of liquid to the circuit, and means for controlling the circuit valve and non-return valve comprising a radius-rod pivotally connected with the axle and the vehicle frame, a cam on said radius rod and a bell crank lever one arm of which is in contact with the circuit valve, while its other arm is in contact with said cam.

8. In a vehicle spring suspension device the combination of a spring adjustably arranged between the axle and frame of the vehicle, and adapted to act thereon in a direction inclined to the direction of movement of the axle during displacement, means for varying the inclination of the spring to suit the load, comprising a cylinder carried on the vehicle frame, a piston movable within said cylinder, a piston rod connecting said piston with said spring, a circuit adapted to be supplied with liquid under pressure, a circuit valve adapted by its movement to complete said circuit, or to interrupt the same and admit liquid therefrom to the cylinder, a spring acting on said circuit valve and tending to maintain it in a position such that said circuit is interrupted, a non-return valve adapted, when the circuit is interrupted by the circuit valve, to be opened by liquid pressure to admit liquid to said cylinder and adapted moreover, when the circuit valve is moved to complete the circuit to be opened by the circuit valve to permit the return of liquid from the cylinder to the circuit, and means for controlling the circuit valve and non-return valve comprising a radius-rod pivotally connected with the axle and the vehicle frame, a cam on said radius rod, and a bell crank lever one arm of which is in contact with the circuit valve while its other arm is in contact with said cam.

9. In a vehicle spring suspension device the combination of a spring adjustably arranged between the axle and frame of the vehicle, means for effecting the adjustment of said spring to suit the load comprising members relatively displaceable under liquid pressure and respectively connected with said spring and with the vehicle frame a liquid circuit adapted to be supplied with liquid under pressure, a non-return valve adapted when the circuit is interrupted by the circuit valve, to be opened by liquid pressure to admit liquid to relatively displace said member and adapted, moreover, when the circuit valve is moved to complete the circuit, to be opened by the circuit valve to permit of the return of liquid to the circuit, and means for controlling the circuit valve and non-return valve comprising a radius-rod pivotally connected with the axle and the vehicle frame, a cam on said radius rod, a bell crank lever one arm of which is in contact with the circuit valve, while its other arm is in contact with said cam, a dash-pot adapted to cushion said circuit valve, and a spring interposed between said circuit valve and said arm in contact therewith.

10. In a vehicle spring suspension device the combination of a spring adjustably arranged between the axle and frame of the vehicle and adapted to act thereon in a direction inclined to the direction of movement of the axle during displacement, means for varying the inclination of the spring to suit the load, comprising a cylinder carried on the vehicle frame, a piston movable within said cylinder, a piston rod connecting said piston with said spring, a circuit adapted to be supplied with liquid under pressure, a circuit valve adapted by its movement to complete said circuit, or to interrupt the same and admit liquid therefrom to the cylinder, a spring acting on said circuit valve and tending to maintain it in a position such that said circuit is interrupted, a non-return valve adapted, when the circuit is interrupted by the circuit valve, to be opened by liquid pressure to admit liquid to said cylinder and adapted moreover, when the circuit valve is moved to complete the circuit to be opened by the circuit valve to permit the return of liquid from the cylinder to the circuit, and means for controlling the circuit valve and non-return valve comprising a radius-rod pivotally connected with the axle and the vehicle frame, a cam on said radius rod, a bell crank lever, one arm of which is in contact with the circuit valve while its other arm is in contact with said cam, a dash-pot adapted to cushion said circuit valve, and a spring interposed between said circuit valve and said arm in contact therewith.

11. In a vehicle spring suspension device, the combination of a spring adjustably arranged between the axle and frame of the vehicle, and means for effecting the adjustment of said spring to suit the load, comprising members relatively displaceable under liquid pressure, one of said members being connected with said spring, a circuit adapted to be supplied with liquid under pressure, a power-driven pump adapted to circulate liquid through said circuit, and means adapted to be actuated by the relative movemnt of the axle and vehicle frame consequent on change of load and to control the passage of liquid under pressure between said circuit and said displaceable members to adjust the spring.

12. In a vehicle spring suspension device, the combination of a spring adjustably arranged between the axle and frame of the vehicle, and means for effecting the adjustment of said spring to suit the load, comprising a cylinder carried on the vehicle frame, a piston movable within said cylinder, a piston rod connecting said piston with said spring, a circuit adapted to be supplied with liquid under pressure, a power driven pump adapted to circulate liquid through said circuit and means adapted to be actuated by the relative movement of the axle and vehicle frame consequent on change of load, and to control the passage of liquid under pressure between said circuit and said cylinder according as the vehicle frame is depressed or raised relatively to the axle.

Signed at the Anglo Egyptian Bank, 27 Clement's Lane, Lombard Street, London, E. C., this eighth day of January, 1913.

GEOFFREY HAMILTON NORMAN.

Witnesses:
J. CLARK,
EDW. A. SYDES.